United States Patent [19]

Kobayashi

[11] 4,364,069

[45] Dec. 14, 1982

[54] MULTI-INK JET HEAD

[75] Inventor: Hiroshi Kobayashi, Tokyo, Japan

[73] Assignee: Ricoh Co., Ltd., Tokyo, Japan

[21] Appl. No.: 260,113

[22] Filed: May 4, 1981

[30] Foreign Application Priority Data

May 8, 1980 [JP] Japan ................................ 55-59960

[51] Int. Cl.$^3$ ........................................ G01D 15/18

[52] U.S. Cl. ........................................ 346/140 R

[58] Field of Search ................................ 346/140 PD

[56] References Cited

U.S. PATENT DOCUMENTS 4,199,770 4/1980 Schnarr ........................ 346/140 PD 4,326,205 4/1982 Fischbeck et al. ........... 346/140 PD

*Primary Examiner*—George H. Miller, Jr.

*Attorney, Agent, or Firm*—Burgess, Ryan & Wayne

[57] ABSTRACT

A multi-ink-jet head in which a plurality of ink distribution tubes each having a nozzle at one end thereof are extended in parallel with each other at a predetermined pitch and n piezoelectric element arrays are mounted on the tube array in such a way that each piezoelectric element array comprising a plurality of piezoelectric elements each of which is mounted on each tube group comprising n (where n is an integer greater than one) ink distribution tubes and the piezoelectric elements in one array are staggered by one ink distribution tube or one pitch from those in the preceding piezoelectric element array so that each ink distribution tube is mounted with n piezoelectric elements each belonging to each piezoelectric element array. Only when n piezoelectric elements on one ink distribution tube are excited simultaneously, a stream of ink can be emitted through the nozzle of said one ink distribution tube.

2 Claims, 6 Drawing Figures

MULTI-INK JET HEAD

BACKGROUND OF THE INVENTION

The present invention relates to a multi-ink-jet head in which the density of an array of ink distribution tubes each having a nozzle at one end thereof can be increased and the width of a nozzle array may be made desirably selected.

In the prior art multi-ink-jet heads, a plurality of ink distribution tubes or passages are branched from an ink manifold, extended in a row and communicated with nozzles which emit continuous streams of ink and one piezoelectric element is mounted on each ink distribution tube. An electrical signal is applied selectively to the piezoelectric elements so that the ink in the excited ink distribution tubes is pressurized and emitted through the nozzles.

The piezoelectric elements cannot be reduced in size beyond certain limits because of their mechanical characteristics or properties and due to some technical problems encountered in the fabrication of the elements. As a result, the nozzles of the ink distribution tubes are arrayed at a predetermined pitch, but the root portions of the ink distribution tubes which are closer to the ink manifold and on which are mounted the piezoelectric elements must be arrayed at a pitch larger than the nozzle pitch so that the contact with the adjacent piezoelectric element can be avoided. Therefore, the ink distribution tube array has a front width (that is, the width of the nozzle array) shorter than a root width along the ink manifold, so that it is in the form of a fan with the ink distribution tubes converging slightly toward the front end of the tube array. In consequence, the direction in which the stream of ink is emitted is different from one nozzle to another. Thus, in the prior art multi-ink-jet heads, a number of ink distribution tubes or passages has been limited, so that a number of nozzles is limited and subsequently the width of an array of streams of ink-jet is limited and narrow.

SUMMARY OF THE INVENTION

In view of the above, one of the objects of the present invention is to provide a multi-ink-jet head in which a large number of ink distribution tubes or passages and hence their nozzles can be extended in parallel with each other at a minimum pitch and the width of a nozzle array may be selected.

To this end, according to the present invention, an array of parallel ink distribution tubes spaced apart from each other at the same pitch as that of the nozzles is divided into a plurality of tube groups each comprising n ink distribution tubes. One piezoelectric element is mounted on each tube group, whereby a first piezoelectric element array is formed. Next, one piezoelectric element is mounted on each tube group but is staggered by one tube or one pitch from the piezoelectric element in the first array, whereby a second piezoelectric element array is formed. Repeating this procedure, n piezoelectric element arrays are formed and each ink distribution tube is mounted with n piezoelectric elements. Therefore, only when n piezoelectric elements mounted on one ink distribution tubes are excited simultaneously, a stream of ink is emitted through the nozzle of said one ink distribution tube.

According to the present invention, therefore, the nozzle pitch can be reduced to a minimum so that the density of picture elements can be considerably increased. In addition, the width of a nozzle array can be increased so that the printing speed can be remarkably improved. Moreover, it becomes possible to lower the level of a signal to be applied to each piezoelectric element so that a circuit for driving the piezoelectric elements can be designed and constructed at a higher degree of integration.

The above and other objects, effects and features of the present invention will become more apparent from the following description of preferred embodiments thereof taken in conjunction with the accompanying drawings.

BRIEF DESCRIPTION OF THE DRAWINGS

Same reference numerals are used to designate similar parts throughout the figures.

DETAILED DESCRIPTION OF THE PRIOR ART

Figure 1A:
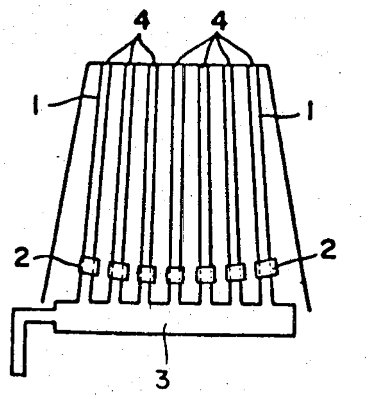
Fig. 1A PRIOR ART
FIGS. 1A and B show in schematic view an array of ink distribution tubes on a prior art multi-ink-jet head.
Figure 1B:
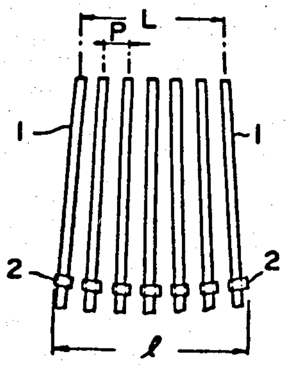
Fig. 1B PRIOR ART

In FIG. 1A is shown a prior art multi-ink-jet head in which a plurality of ink distribution tubes 1 are branched from an ink manifold 3 in a row and communicated with ink emitting nozzles 4. A piezoelectric element 2 is mounted on each tube 1 adjacent to the ink manifold 3. When electrical signals are selectively applied to the piezoelectric elements 2, continuous streams of ink are emitted through the nozzles 4. Because of mechanical characteristics or properties and restrictions on fabrication steps, the piezoelectric elements 2 cannot be reduced in size beyond a certain limit so that the tubes 1 must be so spaced apart from each other that the adjacent piezoelectric elements 2 are prevented from being brought into contact with each other. More particularly, in order to maintain the array of nozzles 4 at a predetermined pitch P as shown in FIG. 1B, the tubes 1 must be arranged in the so-called fan-shape array in such a way that the top width L is shorter than the bottom width l. As a result, the more the tube 1 (and hence its nozzle 4) is spaced apart from the center tube, the more the direction of ink emission through this nozzle 4 is inclined with respect to a recording medium (not shown). Therefore, a number of nozzles 4 which can be mounted on one print head is limited and subsequently the width L of multiple streams of ink drops emerging from the multi-nozzle print head is narrow, so that the improvements in nozzle density and printing efficiency are limited.

DESCRIPTION OF THE PREFERRED EMBODIMENTS

Figure 2:
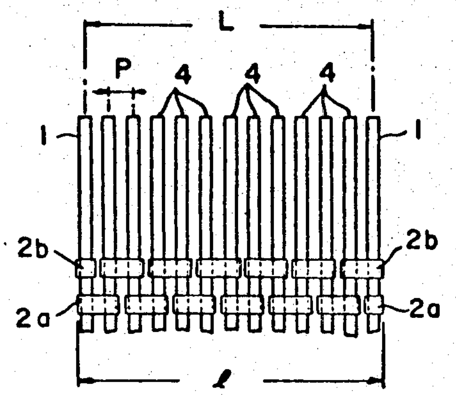
FIG. 2 shows a first embodiment of the present invention.

In FIG. 2 is shown a first embodiment of the present invention. The ink distribution tubes 1 are spaced apart from each other by a distance equal to the nozzle pitch P and are divided into groups or pairs each comprising two tubes 1. One piezoelectric element 2a is mounted on each group or pair, whereby a first piezoelectric element array is formed. In addition, the tubes 1 are divided into pairs or groups each comprising two tubes in such a way that each pair or group is staggered by one tube or one pitch P from the pair or group in the first piezoelectric element array. One piezoelectric element 2b is mounted on each group or pair, whereby a second piezoelectric element array is formed. As a result, two piezoelectric elements 2a and 2b are mounted on each tube 1 and spaced apart by a predetermined distance in the axial direction. Only when synchronizing signals are simultaneously applied to the two piezoelectric elements 2a and 2b on one tube 1, the stream of ink is emitted through the corresponding nozzle 4.

Figure 3:
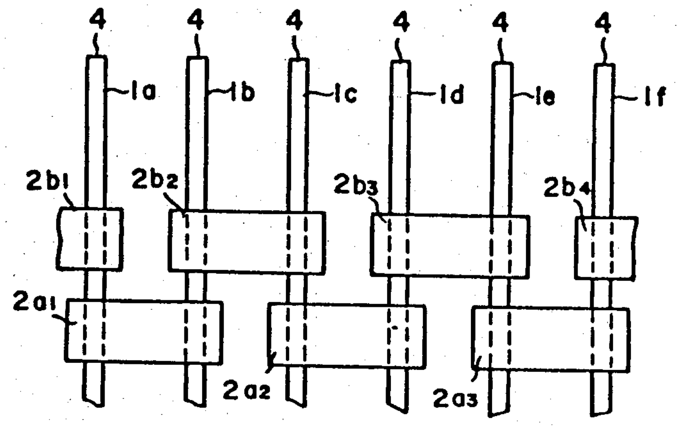
FIGS. 3 and 4 are views used for the explanation of the mode of operation of the first embodiment shown in FIG. 2.
Figure 4:
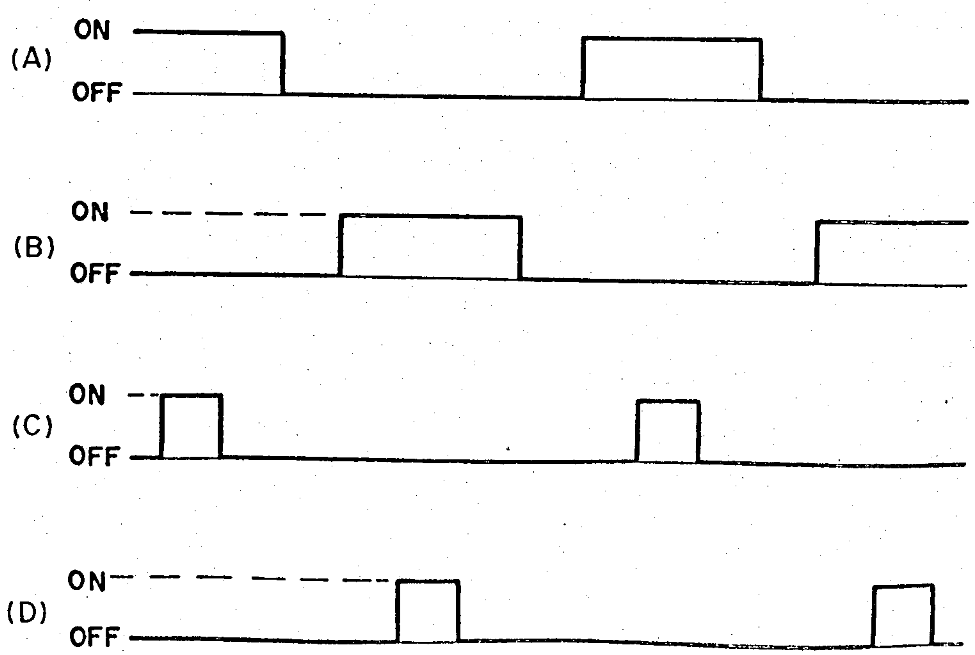

Next, the mode of operation of the first embodiment will be described in more detail with further reference to FIGS. 3 and 4. In FIG. 3 there are shown only six tubes 1a through 1f with the first array comprising the piezoelectric elements $2a_1$, $2a_2$ and $2a_3$ and the second array comprising piezoelectric elements $2b_1$, $2b_2$, $2b_3$ and $2b_4$. The electrical signal as shown at (A) in FIG. 4 is applied to the odd-numbered piezoelectric elements $2b_1$ and $2b_3$ in the second array while the electrical signal as shown at (B) in FIG. 4, to the even-numbered piezoelectric elements $2b_2$ and $2b_4$. When the signals are applied only to the piezoelectric elements $2b_1$ through $2b_4$ in the second array, no stream of ink emerges from the nozzles 4. When the electrical signals are applied to all piezoelectric elements $2a_1$ through $2a_3$ in the first array while the signal is kept applied to the odd-numbered piezoelectric elements $2b_1$ and $2b_3$ in the second array, streams of ink emerge from the nozzles 4 of the tubes 1a, 1d and 1e, but while the signal is kept applied to the even-numbered piezoelectric elements $2b_2$ and $2b_4$ in the second array, streams of ink emerge from the nozzles 4 of the ink distribution tubes 1b, 1c and 1f. When it is desired to emit the stream of ink only through the nozzle 4 of the tube 1a, the electrical signal as shown at (C) in FIG. 4 is applied to the piezoelectric element $2a_1$ while the signal is kept applied to the piezoelectric element $2b_1$. In like manner, in order to emit the stream of ink only through the nozzle 4 of the tube 1b, the electrical signal as shown at (D) in FIG. 4 is applied to the piezoelectric element $2a_1$ when the signal is kept applied to the piezoelectric element $2b_2$ in the second array. In this manner, the stream of ink can be emitted through any of the nozzles 4. As is clear from the above described explanation, no signal is applied simultaneously to the adjacent piezoelectric elements $2b_1$ and $2b_2$, $2b_2$ and $2b_3$, and $2b_3$ and $2b_4$ in the second array. The reason is as follows. When the signal is applied simultaneously to, for instance, the piezoelectric elements $2b_1$ and $2b_2$ in case that it is desired to emit the stream of ink only through the nozzle 4 of the tube 1a, the stream of ink also emerges from the nozzle 4 of the tube 1b when the signal is applied to the piezoelectric element $2a_1$.

In the first embodiment, the piezoelectric elements in the second array have been described as alternately receiving the signal, but it is to be understood that the elements in the first array may be so arranged as to receive the signal alternately.

Figure 5:
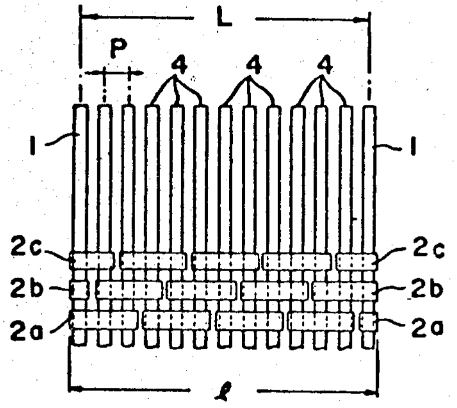
FIG. 5 shows a second embodiment of the present invention.

In FIG. 5 is shown a second embodiment of the present invention. The ink distribution tubes 1 are first divided into a plurality of groups each comprising three tubes and one piezoelectric element 2a is mounted on each group, whereby a first piezoelectric element array is formed. Next, the tubes 1 are further divided into a plurality of groups each of which comprises three tubes and is spaced apart from the tube group in the first array by one tube or one pitch P. One piezoelectric element 2b is mounted on each group in the second tube array, whereby a second piezoelectric element array is formed. In like manner, the tubes 1 are further divided into a plurality of groups each of which comprises three tubes and which are spaced apart from the groups in the second array by one tube or one pitch P. One piezoelectric element 2c is mounted on each group, whereby a third piezoelectric element array is formed. As with the first embodiment, the signal is alternately applied to the piezoelectric elements in one of the arrays.

In general, a plurality of ink distribution tubes 1 are divided into a plurality of groups each comprising n tubes and one piezoelectric element is mounted on each group, whereby a first piezoelectric array is formed. Next, one piezoelectric element is mounted on each group and staggered from the piezoelectric element in the first array by one tube or one pitch P, whereby a second piezoelectric element array is formed. Repeating this procedure, n piezoelectric element arrays are formed. The stream of ink can be emitted from any desired nozzle in a manner substantially similar to that described above. Any two arrays may change their positions.

In summary, according to the present invention, one piezoelectric element is mounted on each group comprising a desired number of tubes 1, so that the ink distribution tubes can be arranged in parallel with each other and spaced apart from each other by a suitable distance. As a result, the pitch of the nozzles can be reduced and consequently the density of picture elements can be increased. In addition, a large number of ink distribution tubes can be arranged in an array, so that the width of the array of nozzle can be increased and subsequently the printing speed can be improved. Furthermore, since a plurality of piezoelectric elements are mounted on each tube, it is possible to reduce the level of the signal to be applied to each piezoelectric element, so that a drive circuit can be designed and constructed in a higher degree of integration density.

What is claimed is:

1. A multi-ink-jet head comprising (a) a plurality of ink distribution tubes which are extended in a row in parallel with each other and spaced apart from each other by a predetermined pitch and each of which is communicated with a nozzle and an ink manifold; and (b) n adjacent piezoelectric element arrays, each array comprising a plurality of piezoelectric elements each of which is mounted on each group comprising n adjacent ink distribution tubes and the piezoelectric elements in one array being staggered by one of the ink distribution tubes from the piezoelectric elements in the preceding array so that each ink distribution tube is mounted with n piezoelectric elements each belonging to each of said n piezoelectric element arrays;

whereby only when said n piezoelectric elements mounted on one ink distribution tube are simultaneously excited, a stream of ink can be emitted through the nozzle of said one ink distribution tube.

2. A multi-ink-jet head as set forth in claim 1 further characterized in that an exciting or synchronizing signal is not impressed simultaneously to the adjacent piezoelectric elements in at least one of said n piezoelectric element arrays.

* * * * *